United States Patent [19]

Friesen et al.

[11] Patent Number: 5,011,214
[45] Date of Patent: Apr. 30, 1991

[54] TRUCK BOX COVER

[76] Inventors: Randolph K. Friesen, 702-351 Saguenay Drive, Saskatoon, Saskatchewan, Canada, S7K 5T4; J. David A. Wight, General Delivery, Hughenden, Alberta, Canada, T0B 2E0

[21] Appl. No.: 543,097
[22] Filed: Jun. 25, 1990
[51] Int. Cl.⁵ .............................................. B60P 3/32
[52] U.S. Cl. .................................. 296/100; 160/213; 220/334
[58] Field of Search ................ 296/100; 160/206, 213; 220/334, 335

[56] References Cited

U.S. PATENT DOCUMENTS

| 3,416,834 | 12/1968 | Morse, Jr. ........................ 296/100 |
| 3,489,456 | 1/1970 | Klanke . |
| 3,768,858 | 10/1973 | Boismier . |
| 3,833,255 | 9/1974 | Logue . |
| 3,858,744 | 1/1975 | Garvert ........................ 296/100 X |
| 4,140,339 | 2/1979 | Fredin . |
| 4,210,361 | 7/1980 | Marvin et al. ................ 296/100 X |
| 4,221,423 | 9/1980 | Stone ................................ 296/100 |
| 4,418,954 | 12/1983 | Buckley ........................ 296/100 |
| 4,585,266 | 4/1986 | Steinberg . |
| 4,610,291 | 9/1986 | Carroll ......................... 160/213 X |
| 4,747,441 | 5/1988 | Apolzer et al. .............. 296/100 X |
| 4,944,550 | 7/1990 | Drown et al. ................. 296/100 |

Primary Examiner—Margaret A. Focarino
Assistant Examiner—Joseph D. Pape
Attorney, Agent, or Firm—Murray E. Thrift; Stanley G. Ade; Adrian D. Battison

[57] ABSTRACT

A cover for a truck box consists of three side by side panel sections hinged together to pivot between a closed position extending across the top of the truck box and an open position arranged face to face and generally vertically along the side of the box. Movement of the panel segments is controlled by a linkage mounted on the underside of the panel segments. The linkage may be driven by an actuator.

21 Claims, 5 Drawing Sheets

TRUCK BOX COVER

FIELD OF THE INVENTION

The present invention relates to truck box covers and more particularly to a weather-proof, rigid cover for a pick-up truck box.

BACKGROUND

Various pick-up box covers have been proposed in the past. These include the covers described in the following:

Klanke U.S. Pat. No. 3,489,456 describes a two part rigid cap. The front part of the cap is permanently mounted on the front half of the truck box, while the rear half opens like a pivoted trunk lid in a passenger automobile. This system does not provide easy access to the full box and it limits the size of objects to be carried to those that can fit under the cap.

Boismier U.S. Pat. No. 3,768,858 describes a multi-panel cover. Two panels are carried on each side of the box and fold over into the centre to close the cover. In the open position, the stacked panels extend along the outsides of the truck box. The individual panels in this system are manipulated into position by hand, making opening and closing a complex operation. The presence of a joint at the centre of the cover leads to the possibility of rain or snow leakage into the cargo space. In the open position, the width of the truck is increased, which can be unacceptable in many cases.

Logue U.S. Pat. No. 3,833,255 describes a two panel cover for dump truck boxes. One of the panels is hinged to the front of the box and is pivoted by two hydraulic cylinders from the closed position to an open, horizontal position extending over the front of the truck. In movement, the front panel drags the rear panel across the top of the box. This arrangement consumes excessive amounts of power, scrapes the top of the box and may have difficulty in closing due to binding of the rear panel against the top of the box in the vertical position.

Fredin U.S. Pat. No. 4,140,339 describes a cover that extends over one side and half the top of a truck box. The cover is not a rigid construction but a tarpaulin or the like. This arrangement is unsuited for use with pick up truck boxes.

Steinberg U.S. Pat. No. 4,585,266 describes a cover for a maneure spreader in which two side by side panels are pivoted upwardly to one side of the spreader by an hydraulic cylinder joining the two. The weight of the unit is carried by a pin running in a track. This will cause problems if there is a build up of snow, ice or dirt in the track. In addition, the use of external hydraulic cylinders is not aesthetically acceptable in the modern pick-up truck market. A further problem with this cover if used with a pick-up truck box would be the tendency of rain or snow on the moving panel to run off into the box during opening.

The present invention proposes an alternative form of rigid truck box cover.

SUMMARY

According to one aspect of the present invention there is provided in combination with a truck box having parallel side walls and an open top therebetween, a cover for the open top of the box, said cover comprising:

a panel including plurality of panel segments hinged together side by side for folding of the panel segments about parallel hinge axes between an extended condition with the panel segments arranged side by side and substantially coplanar and a folded condition with the panel segments arranged face to face;

mounting means mounting an edge of the panel on one side of the truck box for pivotal movement about a mounting axis parallel to the hinge axes;

linkage means connecting the panel segments for causing simultaneous movement of the panel segments between the extended and folded conditions; and support means supporting the panel above the open top of the box such that in the extended condition the panel closes the open top of the box and in the folded condition the panel segments are arranged along said one side of the truck box in an upright orientation.

There are preferably three panel segments with the linkage means and the support means located entirely below the panels. The truck may be used with the cover in either the closed or the open position with minimum obstruction of the cargo space in either.

The hinge lines between the adjacent panels are preferably sealed so that rain or snow may not enter the cargo space. When the three panel arrangement is opened, the end panel is lifted so that any rain or snow on that panel will slide off into the V between the second and third panels rather than into the truck box. The cover is supported entirely from below and there are no tracks and followers to become jammed due to ice, dirt or snow.

The cover may include a powered actuator with or without an auxillary spring system or a damper.

The invention also relates to a cover per se. According to this aspect of the invention there is provided a truck box cover comprising:

a plurality of rigid panel segments including at least first, second and third panel segments arranged side by side and hinged together to move from a closed position with the panels arranged side by side and substantially coplanar to an open position with the panels arranged in a face to face orientation;

mounting hinge means mounted on an edge of the first panel segment for mounting the first panel segment on a side of a truck box so as to pivot about a first hinge axis;

first panel hinge means connecting the first and second panel segments along adjacent edges thereof spaced from the mounting hinge means for pivotal movement about a second hinge axis parallel to the first hinge axis;

second panel hinge means connecting the second and third panel segments along adjacent edges thereof spaced from the second hinge means for relative pivotal movement about a third hinge axis parallel to the first and second hinge axes;

a first link pivotally connected to the first panel segment on a bottom side thereof to pivot about a first link axis parallel to the hinge axes;

a second link pivotally connected to the second panel segment on a bottom side thereof to pivot about a second link axis parallel to the first link axis and pivotally connected to the first link to pivot about a third link axis parallel to the first and second link axes;

a third link connected rigidly to the third panel segment on a bottom side thereof and projecting from the third panel segment beyond the third hinge axis;

a fourth link connected pivotally to the third link to pivot about a fourth link axis parallel to the first, second and third link axes and pivotally connected to one of the first and second links to pivot about a fifth link axis.

BRIEF DESCRIPTION OF THE DRAWINGS

In the accompanying drawings, which illustrate an exemplary embodiment of the present invention.

DETAILED DESCRIPTION

Figure 1:
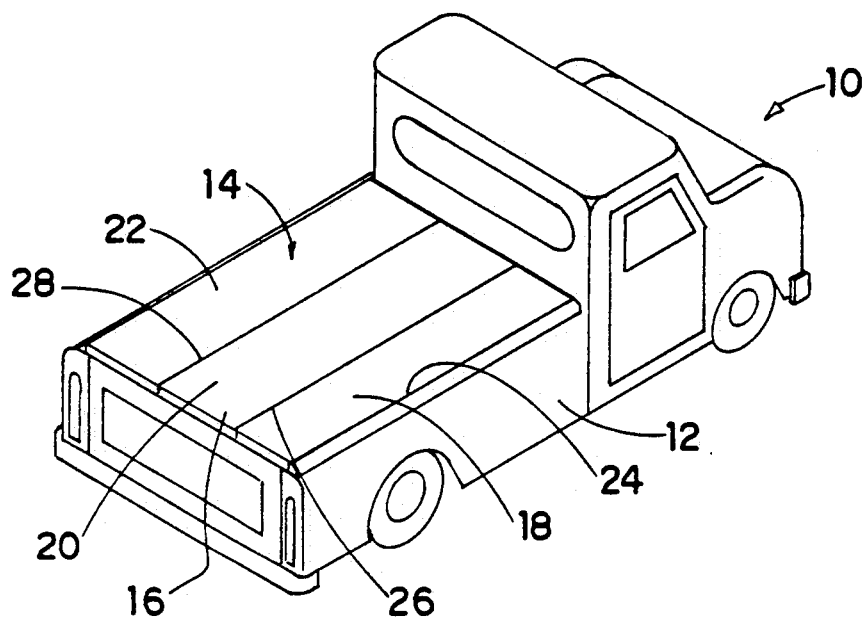
FIG. 1 is a isometric view of a truck with a cover according to the invention in a closed position.
Figure 2:
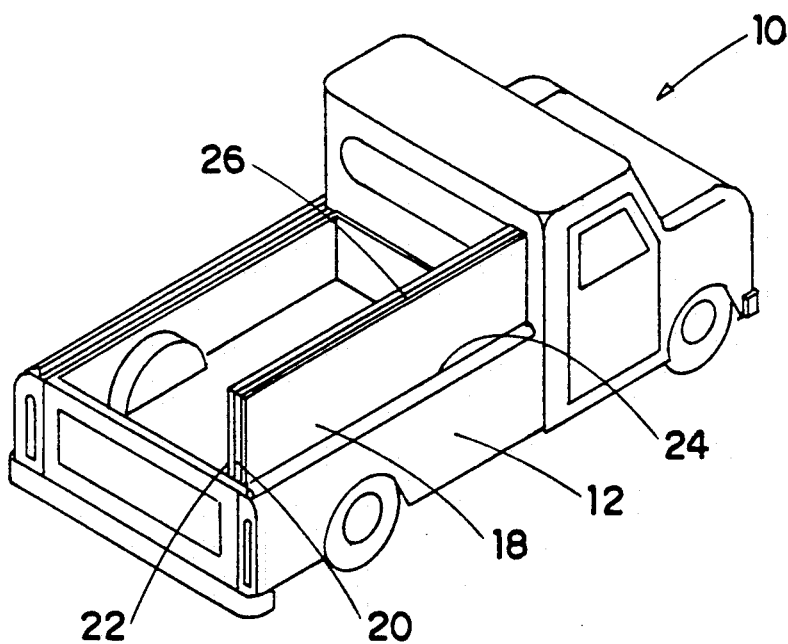
FIG. 2 is a view like FIG. 1 with the cover in an open position.

Referring to the accompanying drawings, and especially to FIGS. 1 and 2, there is illustrated a pick-up truck 10 with a box 12 of conventional construction. The box is equipped with a cover 14 constructed according to the present invention. The cover includes a rigid cover panel 16 consisting of three panel sections 18, 20 and 22 that are coplanar and extend across the open top of the truck box in the closed position illustrated in FIG. 1. The cover panel 16 is mounted along one edge to one side of the truck box by mounting hinge 24. Panel sections 18 and 20 are joined along their mating edges by a hinge 26, while panel sections 20 and 22 are connected by a parallel hinge 28. This allows the panels to fold into the zig zag, face to face, open position illustrated in FIG. 2.

Figure 3:
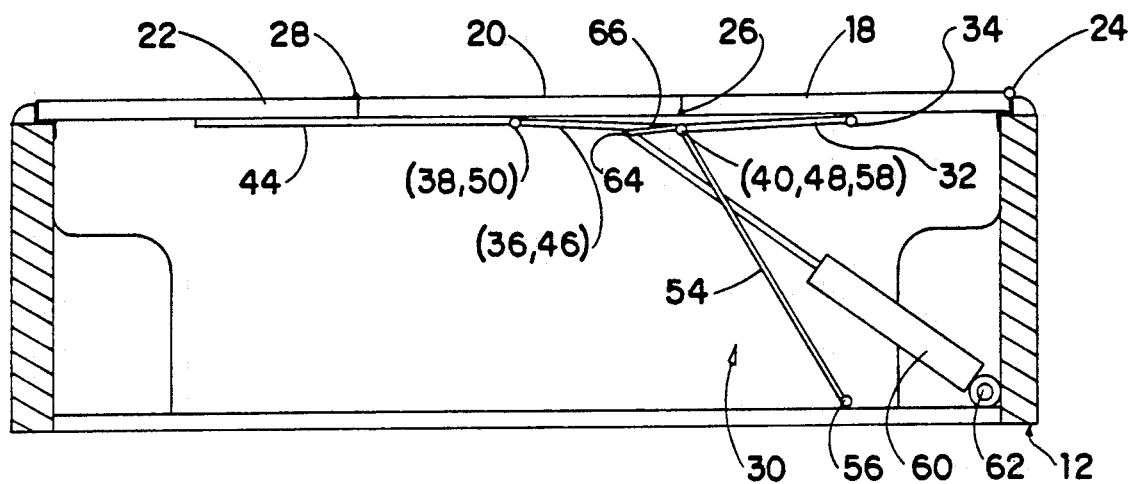
FIG. 3 is a schematic end view of the cover in a closed position.
Figure 4:
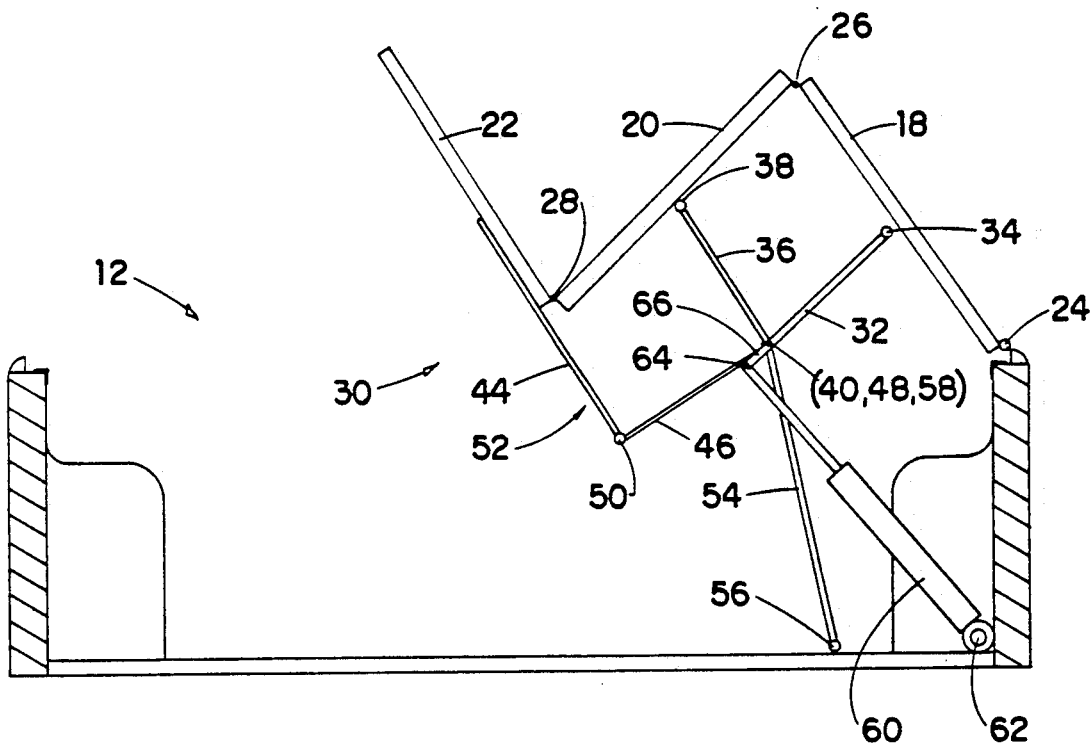
FIG. 4 is a schematic end view of the cover partially open.
Figure 5:
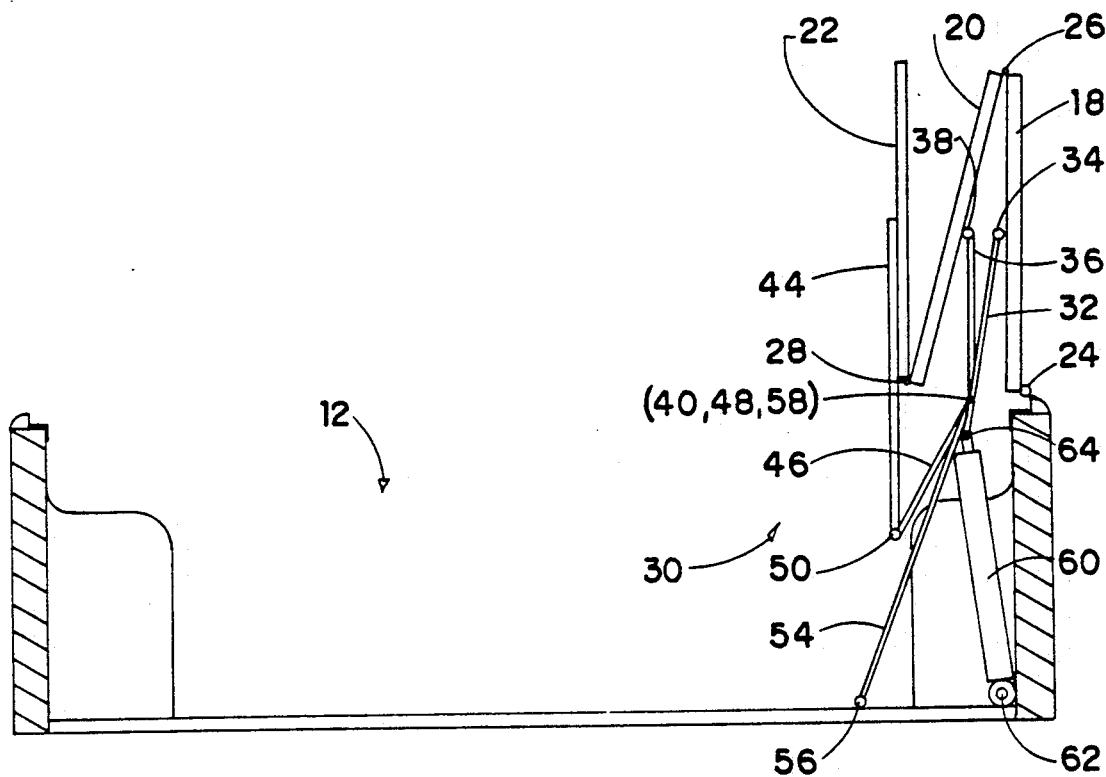
FIG. 5 is a schematic end view of the cover in an open position.

Referring more specifically to FIGS. 3, 4 and 5, there is illustrated a linkage 30 mounted on the underside of the cover panel 16 and acting to cause the simultaneous movement of all three panel segments from the closed position to the open position. The linkage includes a link 32 that is mounted on the underside of the panel segment 18, at its mid-point, by a hinge 34. A second link 36 is pivotally connected to the mid-point of the panel segment 20 by a hinge 38. The links 32 and 36 are connected by a hinge 40 that is, in the closed position of the cover, spaced slightly below the hinge 26. The two links 32 and 36 and the two panel segments 18 and 20 thus constitute an effective four bar linkage as is most readily observed in FIGS. 4 and 5.

A link 44 is connected to the underside of the panel segment 22. It extends beyond the hinge 28. A further link 46 is pivotally connected to the link 32 by hinge 48 acting on the same line as hinge 40. A further hinge 50 connects the end of link 44 to the end of link 46. The links 44 and 46 cooperate with the panel segment 20 and link 36 to provide a second four bar linkage 52 that controls the relative movement of panel segments 20 and 22.

The cover panel is supported by a support arm or strut 54 that is mounted on the floor of the truck box by a hinge 56. It is connected to the link 32 by a hinge 58 acting on the same line as hinges 40 and 48. During movement of the cover from the closed position to the open position, the support arm 54 guides the movement of the common axis of the hinges 48 and 58 and supports the weight of the cover on the truck box.

An electrically operated linear actuator 60 is pivotally mounted on the truck box by a mount 62. It is connected by a pivot 64 to an extension of link 32 beyond the axis of hinge 40.

In operation, as the actuator 60 is shortened, the link 32 pivots around the end of the support arm 54 to raise the panel segment 18 about the mounting hinge 24. This simultaneously causes the remaining linkage to pivot the panel segments 20 and 22 to the position illustrated in FIG. 4. Further contraction of the actuator collapses the cover to the open position illustrated in FIG. 5. As seen in that figure, the support arm 54 and the link 32 have gone over centre and thus effectively lock the cover in that position. With the cover in the closed position, the linkage is effectively self locking as well.

Figure 6:
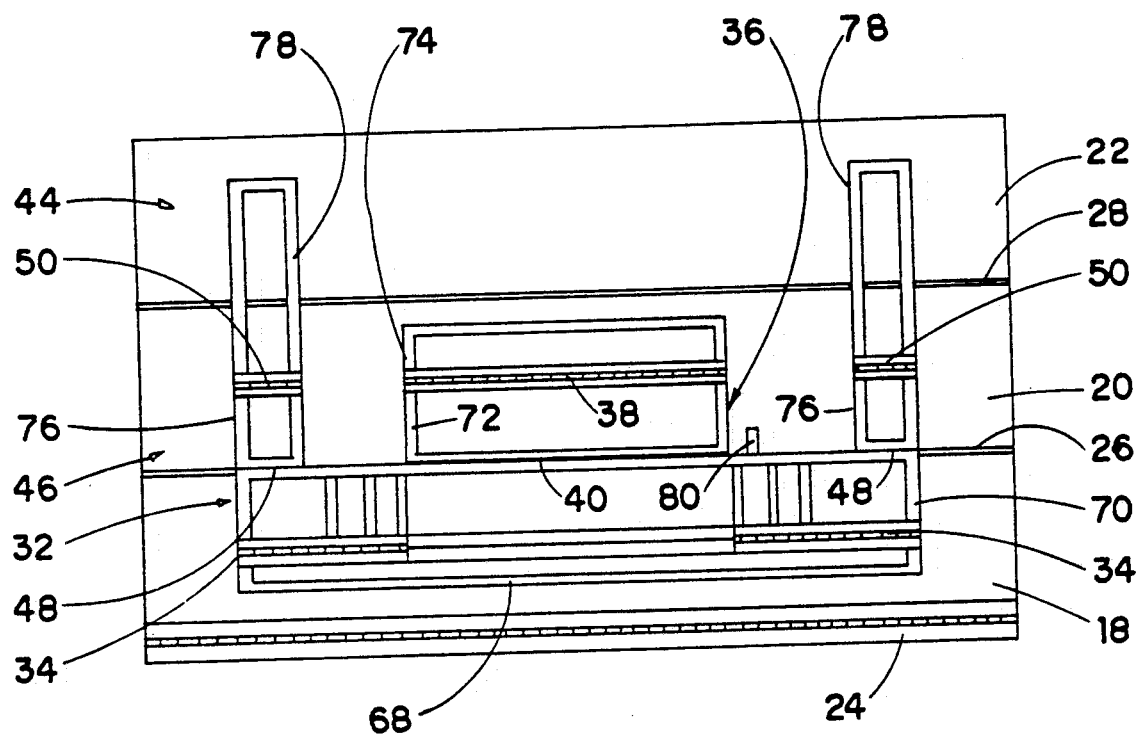
FIG. 6 is a bottom view of the cover in an extended condition.

The actual physical construction of the linkage is illustrated most particularly in FIG. 6. As shown in that figure, the panel segment 18 carries a mounting frame 68 for the hinge 34. The link 32 is a rectangular frame 70. The link 36 is a rectangular frame 72 connected to the centre section of the frame 70 by the hinge 40. The frame 72 is connected by the hinge 38 to a mounting frame 74 affixed on the underside of the panel segment 20. The link 46 is constituted by two rectangular frames 76 connected to the frame 70 on opposite sides of the frame 72. Frames 76 are connected to frame 70 by respective hinges 48. The link 44 is embodied as two rectangular frames 78 hinged to respective ones of the frames 76 by hinges 50.

A single bar 80 projects from the frame 70 to act as the extension 66 of the link 32 for connection to the actuator.

Figure 7:
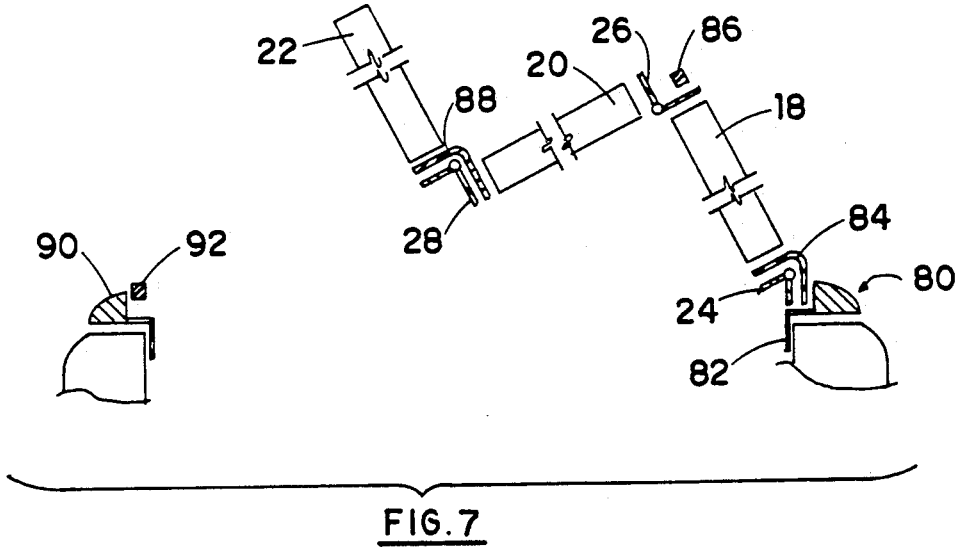
FIG. 7 is a detailed view showing the sealing of the hinges.

FIG. 7 of the accompanying drawings, illustrates the mounting and weather sealing of the cover on the truck box. Along the top of one side wall of the truck box, there is a rail 80 with a mounting angle 82. The mounting hinge 24 is connected to the rail and to the edge of the panel segment 18 and is covered with a water proof seal strip 84. The hinge 26 is shown as carrying a strip of weather stripping material 86 to seal between the hinge plates when the cover is in the closed position. The hinge 28 between the panel segments 20 and 22 has a seal strip 88 much like the seal strip 84 used with the mounting hinge 24. The side of truck box opposite rail 80 carries a second rail 90 with weather stripping 92 to engage the end of the panel in the closed condition.

The front and back ends of the cover may also be sealed with appropriate weather stripping.

With the cover as thus described in the closed position, the cargo space of the vehicle is sealed off from the elements and intruders by a strong, rigid cover. The cargo space under the cover is almost completely unobstructed. The actuator and the support arm are located adjacent one of the wheel wells so as to provide very little interference with the usable cargo space. In the open position, the cover is narrower than the wheel well and provides very little obstruction to the usuable cargo space.

The embodiment of the invention in the foregoing is actuated by an electrically operated linear actuator. This will preferably be controlled by an appropriate switch in the truck cab. It is also possible to construct embodiments of the invention without a powered actuator. It may also be desirable to include a spring acting on the underside of the panel segment 18, tending to pivot it upwardly around the mounting hinge 24. This could be a coil spring extending from the panel segment to the floor of the truck box, or it could be a torsion spring acting between the wall of the truck box and the panel. Movement of the cover may be slowed through the use of an appropriate damper. Where desired springs and dampers may be used in association with the powered actuator.

Figure 8:
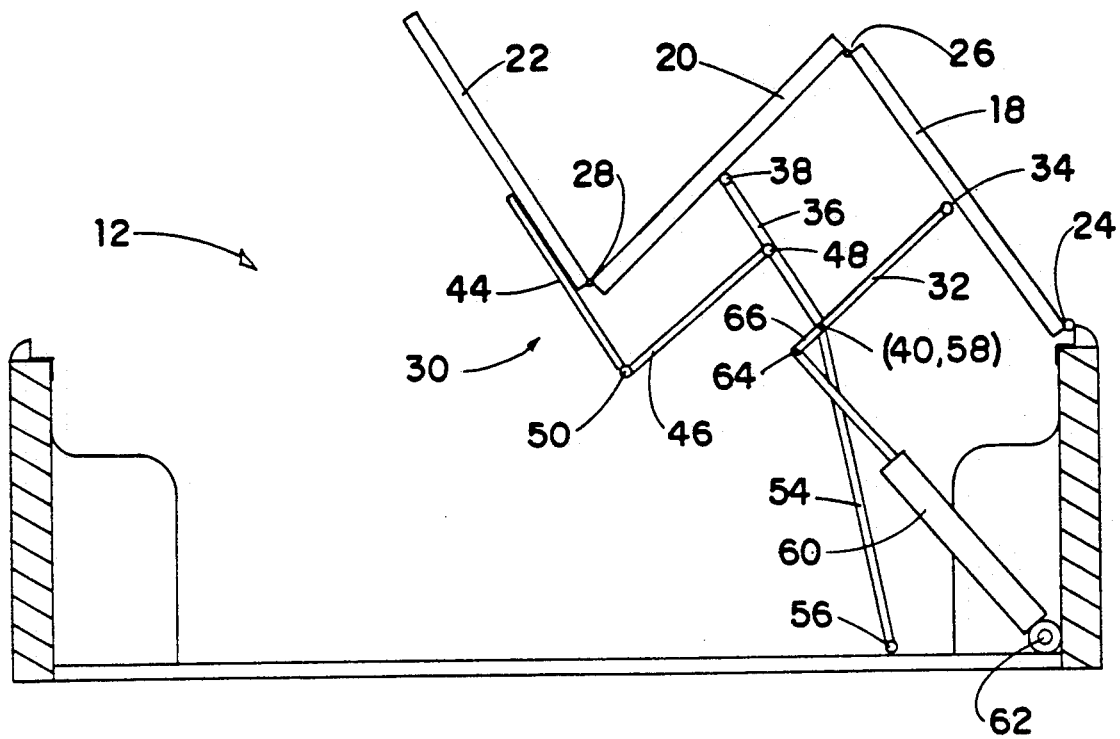
FIG. 8 is a view like FIG. 4 of an alternative embodiment of the invention.

FIG. 8 illustrates an alternative embodiment of the invention in which the link 46 is connected to the link 36 between its ends rather than to the links 32 and 36 on the axis of hinge 40. In this case, the link 44 is somewhat shorter. This arrangement provides more clearance between the hinge 50 and the floor of the truck box. Each of the links 44 and 46 is adjustable in length and the position of hinge 48 is adjustable along the link 36. This arrangement allows the panel 22 to fit more closely against panel 20 in the open position.

Figure 9:
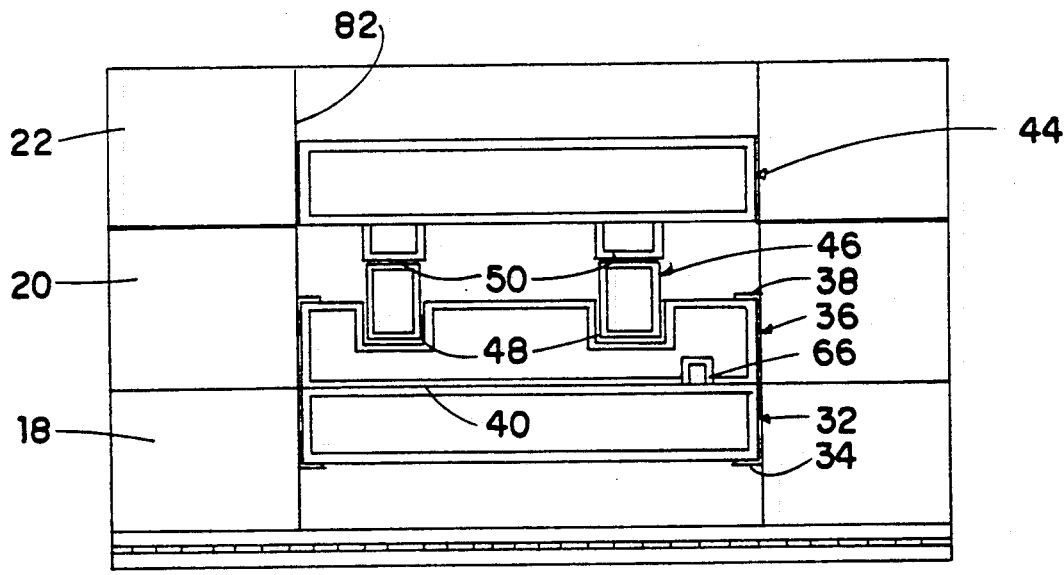
FIG. 9 is a view like FIG. 6 of the embodiment of FIG. 8.

A structure incorporating the linkage illustrated FIG. 8 is shown in FIG. 9. This arrangement is similar to that illustrated in FIG. 6 but it does not employ the mounting frames 60 and 74. The panel segments are recessed at the centre to provide a linkage cavity 82 into which the linkage is recessed to limit any interference with the face-to-face engagement of the panels in the open position.

It is to be understood that the present invention is not to be considered limited to the specific embodiments described in the foregoing. The scope of the invention is to ascertained solely by reference to the appended claims.

We claim:

1. In combination with a truck box having parallel side walls and an open top therebetween, a cover for the open top of the box, said cover comprising:
   a panel including plurality of panel segments hinged together side by side for folding of the panel segments about parallel hinge axes between an extended condition with the panel segments arranged side by side and substantially coplanar and a folded condition with the panel segments arranged face to face;
   mounting means mounting an edge of the panel on one side of the truck box for pivotal movement about a mounting axis parallel to the hinge axes;
   linkage means connecting the panel segments for causing simultaneously movement of the panel segment between the extended and folded conditions; and
   support means supporting the panel above the open top of the box such that in the extended condition the panel closes the open top of the box and in the folded condition the panel segments are arranged along said one side of the truck box in an upright orientation.

2. The invention according to claim 1 wherein the panel consists of first, second and third panel segments.

3. The invention according to claim 2 wherein the linkage means cooperate with each two adjacent panel segments to define a four bar linkage.

4. The invention according to claim 3 wherein adjacent ones of the four bar linkages are coupled for simultaneous movement thereof.

5. The invention according to claim 4 wherein the linkage means are located on the bottom side of the panel.

6. The invention according to claim 5 wherein the support means comprise a support strut pivotally connected to the truck box and to the linkage means.

7. The invention according to claim 6 including actuator means for movement of the panel segments between the extended and folded conditions.

8. The invention according to claim 7 wherein the actuator means comprise a linear actuator.

9. The invention according to claim 8 wherein the actuator means comprise an electrically operated linear actuator.

10. The invention according to claim 1 including seal means for sealing the panel segments together along adjacent edges thereof.

11. A truck box cover comprises:
   a plurality of rigid panel segments including at least first, second and third panel segments arranged side by side and hinged together to move from a closed position with the panels arranged side by side and substantially coplanar to an open position with the panels arranged in a face to face orientation;
   mounting hinge means mounted on an edge of the first panel segment for mounting the first panel segment on a side of a truck box so as to pivot about a first hinge axis;
   first panel hinge means connecting the first and second panel segments along adjacent edges thereof spaced from the mounting hinge means for pivotal movement about a second hinge axis parallel to the first hinge axis;
   second panel hinge means connecting the second and third panel segments along adjacent edges thereof spaced from the second hinge means for relative pivotal movement about a third hinge axis parallel to the first and second hinge axes;
   a first link pivotally connected to the first panel segment on a bottom side thereof to pivot about a first link axis parallel to the hinge axes;
   a second link pivotally connected to the second panel segment on a bottom side thereof to pivot about a second link axis parallel to the first link axis and pivotally connected to the first link to pivot about a third link axis parallel to the first and second link axes;
   a third link connected rigidly to the third panel segment on a bottom side thereof and projecting from the third panel segment beyond the third hinge axis;
   a fourth link connected pivotally to the third link to pivot about a fourth link axis parallel to the first, second and third link axes and pivotally connected to one of the first and second links to pivot about a fifth link axis.

12. A cover according to claim 11 including support means comprising a support strut pivotally connected to the first and second links at the third link axis.

13. A cover according to claim 12 wherein the support strut is adapted to be pivotally mounted on a truck box floor substantially midway between the positions of the third link axis in the closed and open positions of the cover.

14. A cover according to claim 13 including actuator means comprising a linear actuator pivotally connected to an extension of the first link beyond the third link axis.

15. A cover according to claim 14 wherein the first, second and third panel segments are of substantially equal widths.

16. A cover according to claim 15 wherein the first link between the first and third link axes is substantially equal in length to one-half the width of one panel segment.

17. A cover according to claim 16 wherein the second link between the second and third link axes is substantially equal in length to one-half the width of one panel segment.

18. A cover according to claim 17 wherein the third link projects beyond the third hinge means a distance substantially equal to one-half the width of one panel segment.

19. A cover according to claim 18 wherein the fourth link has a length between the third and fourth link axes substantially equal to one-half the width of one panel segment.

20. A cover according to claim 18 wherein the fifth link axis coincides with the third link axis.

21. a cover according to claim 11 wherein the linkage is self locking in the closed and open positions.

* * * * *